(12) United States Patent
Belpaire et al.

(10) Patent No.: US 9,248,870 B2
(45) Date of Patent: Feb. 2, 2016

(54) REINFORCED PANEL STRUCTURE (75) Inventors: Vincent Belpaire, Uccle (BE);
Sebastien Delneufcourt, Namur (BE);
Glenn Jarvis, Cambridgeshire (GB)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 14/004,286

(22) PCT Filed: Mar. 8, 2012

(86) PCT No.: PCT/EP2012/053999
§ 371 (c)(1),
(2), (4) Date: Sep. 10, 2013

(87) PCT Pub. No.: WO2012/123327
PCT Pub. Date: Sep. 20, 2012

(65) Prior Publication Data
US 2014/0001791 A1      Jan. 2, 2014

(30) Foreign Application Priority Data

Mar. 11, 2011 (EP) .................................... 11157882

(51) Int. Cl.
*B62D 29/00* (2006.01)
(52) U.S. Cl.
CPC ......... *B62D 29/002* (2013.01); *Y10T 29/49826* (2015.01)
(58) Field of Classification Search
CPC ..... B29D 29/00; B29D 29/002; B60J 5/0452; B60J 5/0545
USPC ...................... 52/232, 801.1, 801.11, 800.12; 29/897.2; 296/187.02, 191, 146.6, 296/193.11; 264/46.4–46.6
See application file for complete search history.

(56) References Cited

U.S. PATENT DOCUMENTS

| | | | | |
|---|---|---|---|---|
| 3,868,796 A | * | 3/1975 | Bush | 52/783.12 |
| 4,369,608 A | * | 1/1983 | Miura et al. | 52/309.9 |
| 4,377,609 A | * | 3/1983 | Bartoli et al. | 428/71 |
| 4,378,395 A | * | 3/1983 | Asoshina et al. | 428/158 |
| 4,397,914 A | * | 8/1983 | Miura et al. | 428/43 |
| 4,444,818 A | * | 4/1984 | Tominaga et al. | 428/34.5 |
| 4,451,518 A | * | 5/1984 | Miura et al. | 428/137 |

(Continued)

FOREIGN PATENT DOCUMENTS

DE    101 43 550 C1    10/2002
DE    102 60 531 A1    7/2004

(Continued)

OTHER PUBLICATIONS

International Search Report and Written Opinion for PCT/EP2012/053999, mailed Mar. 27, 2012; ISA/EP.

*Primary Examiner* — Robert Canfield
(74) *Attorney, Agent, or Firm* — Harness, Dickey & Pierce, PLC (57) ABSTRACT

Exemplary reinforced structures, e.g., panel structures, and methods of making the same are disclosed. A reinforced structure may include a panel support extending along a panel. The panel support may be relatively rigid in comparison to the panel. The structure may further include an expandable support having a body portion mounted on the panel support. The body portion may be formed of an expandable material such that the body portion is configured to engage the panel upon expansion, thereby providing an expanded support acting between the panel and the panel support after expansion.

15 Claims, 5 Drawing Sheets

(56) References Cited

U.S. PATENT DOCUMENTS

| | | | |
|---|---|---|---|
| 4,874,650 A * | 10/1989 | Kitoh et al. | 428/68 |
| 5,866,052 A * | 2/1999 | Muramatsu | 264/46.6 |
| 7,249,415 B2 * | 7/2007 | Larsen et al. | 29/897.2 |
| 8,656,669 B2 * | 2/2014 | Schneider et al. | 52/232 |
| 8,726,590 B2 * | 5/2014 | Miura et al. | 52/232 |
| 2006/0006698 A1 * | 1/2006 | Ishikawa et al. | 296/193.11 |
| 2006/0272884 A1 * | 12/2006 | Vilcek et al. | 181/198 |
| 2009/0001758 A1 * | 1/2009 | Hanley et al. | 296/187.02 |
| 2010/0092733 A1 * | 4/2010 | Blank et al. | 428/174 |
| 2014/0105669 A1 * | 4/2014 | Coudron | 403/30 |

FOREIGN PATENT DOCUMENTS

| | | |
|---|---|---|
| EP | 1 932 648 A1 | 6/2008 |
| EP | 2 261 104 A1 | 12/2010 |
| EP | 2497700 A1 * | 9/2012 |
| FR | 2 897 335 A1 | 8/2007 |

* cited by examiner

FIG. 6

REINFORCED PANEL STRUCTURE

CROSS-REFERENCE TO RELATED APPLICATIONS

This application is a 371 U.S. National Stage of International Application No. PCT/EP2012/053999, filed Mar. 8, 2012, and claims priority to European Patent Application 11157882.9, filed Mar. 11, 2011, the disclosures of which are herein incorporated by reference in their entirety.

BACKGROUND

Panels for vehicle applications, e.g., roof or door panels, are typically relatively thin in order to meet vehicle weight requirements and allow the panels to be shaped as may be desired for aesthetic and manufacturing reasons. The size and generally flat shape typical of these panels makes them susceptible to deformation. For example, sheetmetal panels may expand during vehicle body coating or painting operations under the application of heat. Additionally, the panels may experience deformation during vibration or other stresses imparted to the panel during vehicle operation.

Vehicle panels are therefore often reinforced using additional structural pieces such as a ribbed brace or reinforcement. Generally such braces are bonded directly to the panel with a very stiff structural reinforcing material. For example, adhesives may be applied to a brace or reinforcement in a bead extending along the brace. Since the brace is applied directly to the panel using the adhesive, variances in the thickness of the adhesive bead can create larger problems. Where an adhesive bead is too thin, a gap may be created between the brace and the panel and reduce structural support to the panel. Where an adhesive bead is too thick, excess adhesive may prevent proper coating of the vehicle body, e.g., in a electo-coating process.

Heat application processes typical of vehicle body construction, e.g., paint baking processes, may also cause difficulties for bonding of braces to a panel. For example, gaps between the brace and panel may be exacerbated where the panel and brace are formed of different materials having different thermal expansion rates. Additionally, when rigid structural foams, reinforcing materials, or other adhesives are used to bond braces directly to a panel, local plastic deformations may occur as a result of the different thermal expansion rates or variances in the applied bonding material, causing a permanent visible deformation on the outside of the panel.

FR 2897335 discloses a mastic bead that is expandable. Such mastic materials tends to be very sticky, and are also typically applied in a paste form or are otherwise viscous in nature. Accordingly, a mastic material is generally difficult to apply, and at a minimum may require specialized machinery for applying the mastic material accurately and in the appropriate amount. Additionally, the material properties of the expanded mastic materials may cause similar problems noted above in regard to other known bonding materials, which may cause a permanent visible deformation on the outside of the panel due in part to the rigidity of the expanded material.

Accordingly, there is a need for an improved reinforced panel or support structure that provides adequate stiffness to a panel while minimizing the above difficulties.

SUMMARY

An exemplary reinforced structure may include a panel support extending along a panel. The panel support may be relatively rigid in comparison to the panel. The structure may further include an expandable support having a body portion mounted on the panel support. The body portion may be formed of an expandable material such that the body portion is configured to engage the panel upon expansion, thereby providing an expanded support acting between the panel and the panel support after expansion. The expandable support may be formed of a material configured to expand to an expanded material having a Young's modulus less than structural reinforcers previously used to bond reinforcing structures directly to an associated structure. In one exemplary illustration, a Young's modulus of the expanded support is less than 300 MPa.

DETAILED DESCRIPTION

Various exemplary illustrations are provided herein of reinforced structures, e.g., a panel structure as may be employed for a vehicle, and methods of making the same. While the panel structures are generically described below, the panel structures may be any vehicle panel assembly, e.g., a door panel assembly, roof panel assembly, or any other panel assembly that is convenient.

Figure 1:
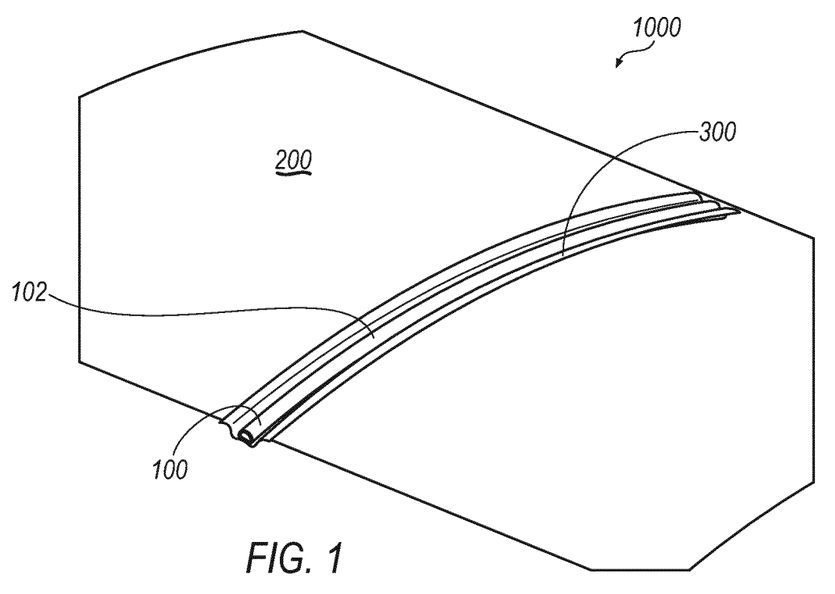
FIG. 1 illustrates a partial cutaway perspective view of an exemplary panel brace.

Turning now to FIGS. 1-5, exemplary reinforced structures 1000 are illustrated in further detail. Referring to FIG. 1, a reinforced structure 1000 is illustrated that includes an expandable support 100, a panel 200, and a brace or support 300. Panel 200 may be formed of any material that is convenient, e.g., sheet-metal, steel or the like. As will be described further below, the expandable support 100 may be formed of an expandable material. Exemplary expandable materials may include any other expandable materials that may be convenient, including those activated by application of heat, a curing agent, as will be described further below.

As noted above, panel 200 may have a different thermal expansion characteristic than the support 300, e.g., as a result of the panel 200 and support 300 being formed of different materials or having different thicknesses. Moreover, while the panel 200 is relatively thin and potentially susceptible to localized elastic deformation, support 300 may be relatively stiff. Further, the support 300 may increase overall stiffness of the panel 200 and the reinforced structure 1000 as a result of engagement between the support 300 and panel 200, e.g., via the expandable support 100, as will be described further below. Engagement between the support 300 and the panel 200 may therefore increase resistance of the panel 200 to bending relative to support 300, e.g., during application of heat during a coating process associated with the panel 200.

Figure 2:
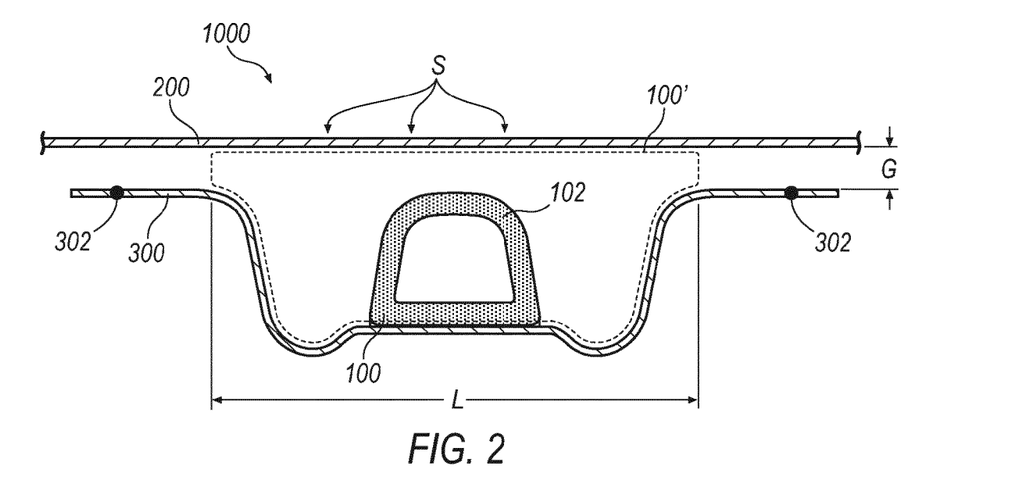
FIG. 2 illustrates a cross-sectional view of the exemplary panel brace of FIG. 1.

Turning now to FIG. 2, the exemplary reinforced structure 1000 of FIG. 1 is shown in further detail. The expandable support 100 is shown having a generally hollow body portion 102 that may be extruded, as will be described further below. The hollow cross-sectional shape may decrease overall weight. A cross-sectional shape of the body portion 102 may be generally trapezoidal, e.g., as shown in the Figures, or may be another shape, e.g., rectangular, square, triangular, or round. The expandable support 100 may generally expand, e.g., according to application of heat, to fill a cavity formed by the support 300 and the panel 200. Accordingly, expandable support 100 may expand into an expanded support 100' that generally fills the cavity and secures the support 300 to the panel in a generally permanent manner. More specifically, as shown in FIG. 2 expanded support 100' defines a length L along the panel 200 after expansion. In one exemplary illustration, length L is between approximately 30 and 100 millimeters (mm).

Panel 200 may be initially secured to support 300 by attachment features 302 such as welding, rivets or additional connecting pieces at both ends of the support 300. This advantageously reduces or eliminates degradation of the exterior surface S of the panel 200, which is a visible surface on the outside of the vehicle, by any fixation methods or elements. Due to the shape tolerances, assembly tolerances, and the above-mentioned thermal deformation characteristics of the panel 200 and support 300, a gap G is provided between the panel 200 and support 300 upon securement of the support 300 at both ends, e.g., via the attachment features 302. The gap G may vary along the axis of the support 300, and during temperature changes experienced by the vehicle structure in a coating and/or painting oven. The gap G thereby allows variations in the space between the panel 200 and support 300 that may result from different thermals expansion characteristics of the panel 200 and support 300. In one exemplary illustration, the gap G is in the range of approximately 2 to 10 millimeters.

Furthermore, the gap G between the panel 200 and support 300 may be employed, for example, to allow coating of the panel 200 and support 300 prior to expansion of the expandable support 100. More specifically, prior to expansion of the expandable support 100, the reinforced structure 1000 may be dipped in an electrocoating bath, where a fluid is allowed to flow along the panel 200 and other components of an associated vehicle structure to increase resistance to corrosion. The gap G generally allows electrocoating fluid to flow into the cavity between the panel 200 and support 300, thereby allowing nearly all of the relevant surfaces of support 300 and panel 200 to be properly coated.

The expanded support 100' may generally permanently bond the support 300 to the panel 200, thereby increasing stiffness of the reinforced structure 1000 by way of the expansion and bonding of the expandable support 100. Accordingly, support 300 may impart increased stiffness and rigidity to the panel 200.

At the same time, the expanded material of the expanded support 100' may also define a stiffness after expansion that is not so great as to causes deformations or other marking of the panel 200 especially along an exterior surface S of the panel 200, in contrast to some previously known approaches where a very stiff bonding agent is applied, or a mastic material such as that described in FR 2897335. For example, the expandable support 100 may expand to fill the cavity between the panel 200 and support 300 without "forcing" apart the support 300 and the panel 200 greater than the initially defined gap G or "following" the thermal deformation and variation in the gap G in an electro-coating or paint baking process. Further, the expanded baffle 100' extends along a sufficient length L of the panel 200 such that the generally permanent fixation of the support 300 to the panel 200 is sustained along a relatively long length L of the panel 200, thereby generally spreading load that may be transferred between the support 300 and the panel 200. Accordingly, while the panel 200 is substantially stiffened by the bonding of the support 300 to the panel 200 by the expandable support 100, the expandable support 100 does not impart localized deformation or otherwise "show" on the surface S of the panel 200.

In contrast to structural reinforcing materials or mastic materials previously used to bond braces or supports directly to a panel, expandable materials that may be employed with any of the exemplary illustrations may include materials that have a decreased stiffness or Young's modulus. Alternatively or in addition, an expandable material used to form the expandable support 100 may have a greater expansion ratio than that typical of structural reinforcing materials typical of previous applications where a support or brace is bonded directly to a panel. Moreover, the use of a relatively higher expansion ratio may allow reductions in weight, e.g., by employing a hollow shape, as smaller amounts of material may be employed to generally fill the cavity between the panel 200 and the support 300.

In one exemplary illustration an expandable material used to form expandable support 100 has a compression Young's modulus between 1-100 MPa after expansion of the expandable support 100. Compression Young's modulus was determined according to ASTM Re-003-F with expanded and cured specimens consisting of parallelepipedic samples of 25×25×9 mm at a temperature of 23° C., humidity of 50% RH and velocity of 1 mm/min. In another exemplary illustration, the compression Young's modulus is between 2-25 MPa. Moreover, in one exemplary illustration the expandable support has an expansion ratio of 400% to 2000%. In yet another example, the expansion rate of the expandable material used to form the expandable support 100 is between 400% and 1000%. By contrast, typical structural reinforcing materials may have a post-expansion compression Young's modulus of at least 300 MPa, and an expansion ratio no higher than 250%. Exemplary expandable materials may include, merely as examples, a baffle material available under the name Sika-Baffle, e.g., SikaBaffle SB250NT, SikaBaffle SB250, SikaBaffle SB255, SikaBaffle SB250PB2, or SikaBaffle SB250PB3.

Expandable materials of this kind may expand or foam under the influence of heat. Some exemplary thermally foamable materials are further described in U.S. Pat. Nos. 5,266,133 and 5,373,027, whose disclosures are hereby incorporated by reference in their entireties. It is of course also possible to use other expandable materials, which may be activated by external heat sources or internal heat sources, such as by an exothermic reaction, for example.

In one exemplary illustration, an expandable material is formed in an extrusion process, e.g., as further described below, such that the expandable support 100 is formed in a solid block or piece. The expandable material may also be generally non-tacky, thereby facilitating handling of the expandable support 100 by hand. Accordingly, application and assembly of the expandable support 100 is relatively easy and may be accomplished without specialized tools or machines, as may be required for application of some bonding agents, viscous adhesive materials or mastics, e.g., as disclosed by FR 2897335.

Figure 3A:
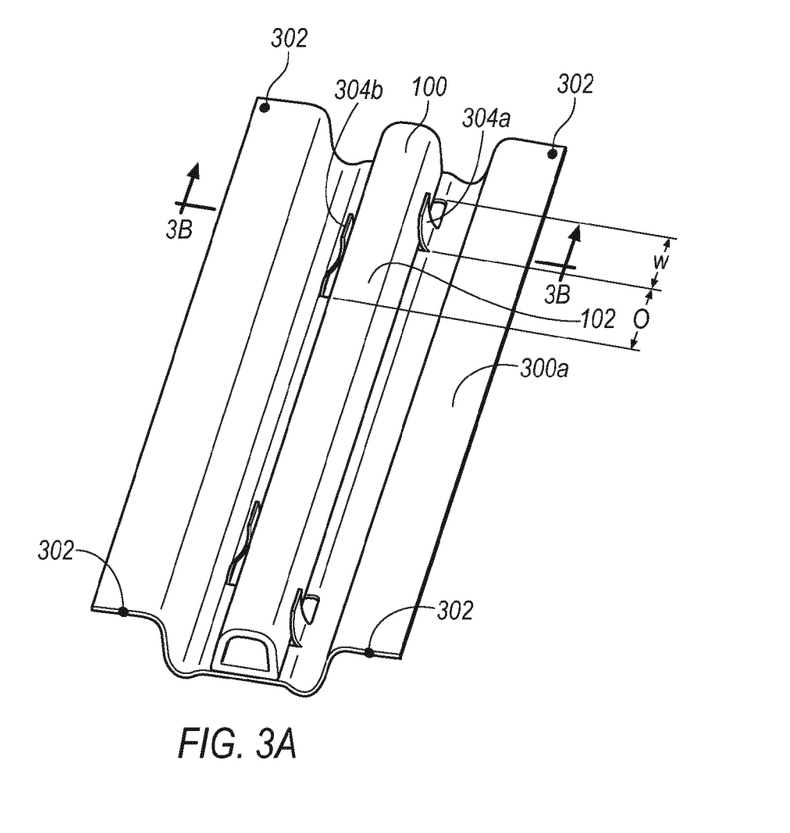
FIG. 3A illustrates a perspective view of another exemplary panel brace.
Figure 3B:
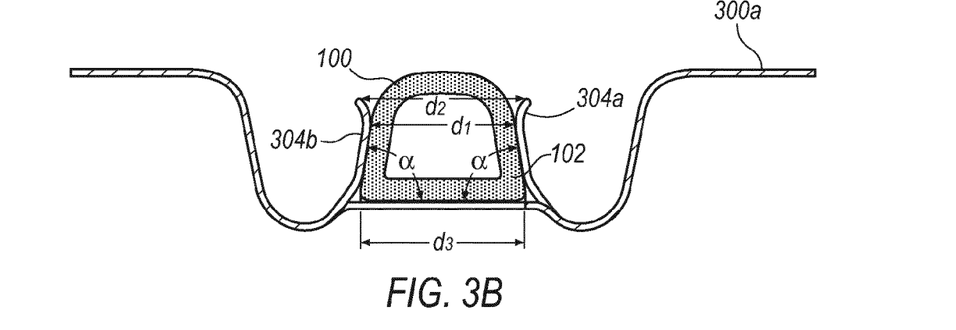
FIG. 3B illustrates a cross-sectional view of the exemplary panel brace of FIG. 3A.
Figure 4A:
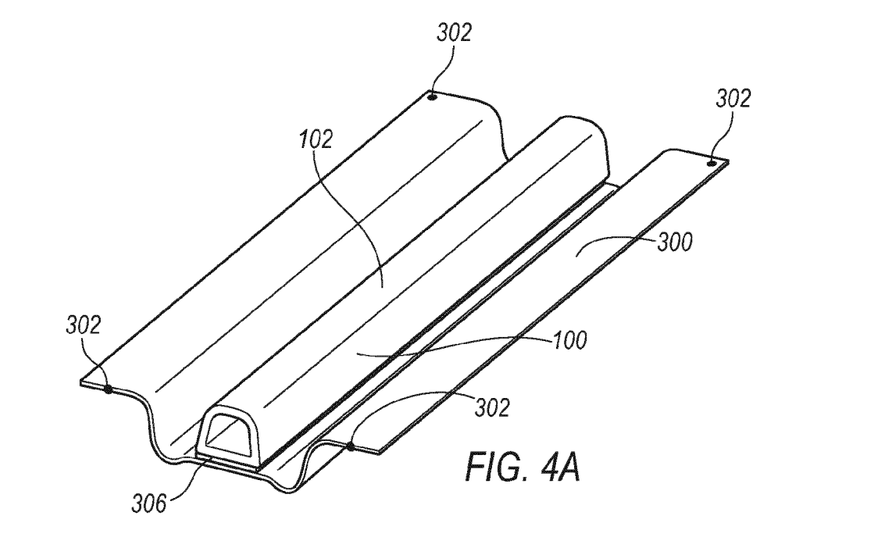
FIG. 4A illustrates a perspective view of another exemplary panel brace.
Figure 4B:
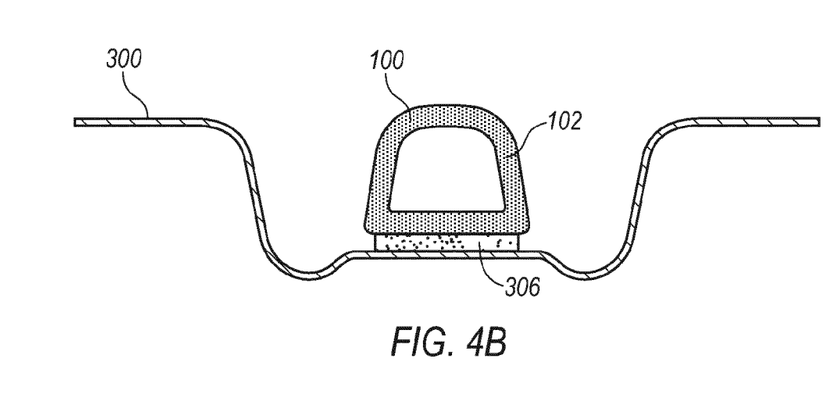
FIG. 4B illustrates a cross-sectional view of the exemplary panel brace of FIG. 4A.

The expandable support 100 may be secured to the support 300 in any manner that is convenient. For example, as shown in FIGS. 3A and 3B, the body portion 102 of expandable support 100 may be generally secured to the support 300 by way of opposing support interlocking features or clips 304. More specifically, a first interlocking feature 304a abuts, engages, or otherwise contacts a first side of the body portion 102. At the same time, at least one other interlocking feature 304b abuts an opposing surface of the body portion 102. Accordingly, the body portion 102 of the expandable support 100 is generally retained between the support interlocking features 304 of the support 300. Moreover, the extruded and/or non-tacky construction of the expandable support 100 prior to expansion may generally facilitate assembly of the expandable support 100 between the interlocking features 304, e.g., by allowing the expandable support 100 to generally be slid in between the interlocking features 304.

As best seen in FIG. 3A, the interlocking features 304 may be formed generally in pairs, e.g., as with first interlocking feature 304a and second interlocking feature 304b, that clamp the body portion 102 of the expandable support therebetween to retain the expandable support 100 to the support 300. Moreover, the first and second interlocking features 304a, 304b may be offset by an offset distance O. Accordingly, a clamping or retention force associated with the expandable body 100 may be determined at least in part from the offset O between the interlocking features 304a, 304b.

As best seen in FIG. 3B, interlocking features 304 may form an angle α of less than 90° with the main surface of the support. The interlocking features 304 may also be spaced apart a minimum distance $d_1$ that is less than a maximum width $d_3$ of the expandable support 100. Accordingly, the expandable support 100 may generally be secured into position when engaged in between the pair of interlocking features 304. The distal ends of the interlocking features 304 may be further folded outwardly, i.e., away from each other, to facilitate the insertion of the expandable support 100. Accordingly, an opening width 62 at the extremity of the interlocking features 304 may be larger than the width $d_3$ of the expandable support 100. The expandable support 100 may be secured over the length with any number of pairs of interlocking features 304, e.g., at least two pairs as shown in FIG. 3A.

The support interlocking features 304 may be formed integrally with the support 304. For example, the interlocking features 304 may be formed in a stamping or punching operation, wherein tab or wing portions of the support 300 are formed into place as shown in FIGS. 3A and 3B. Accordingly, the interlocking features 304 may be formed integrally from a same blank or sheet from which the support 300 is initially formed.

The expandable support 100 may be secured to the support in any other manner that is convenient. For example, turning now to FIGS. 4A and 4B, another exemplary illustration of an expandable support 100 is shown. Expandable support 100 may be secured to support 300 with a bonding agent or adhesive 306. Adhesive 306 may generally secure the expandable support 100 to the support 300 prior to expansion of the expandable support 100.

Figure 5A:
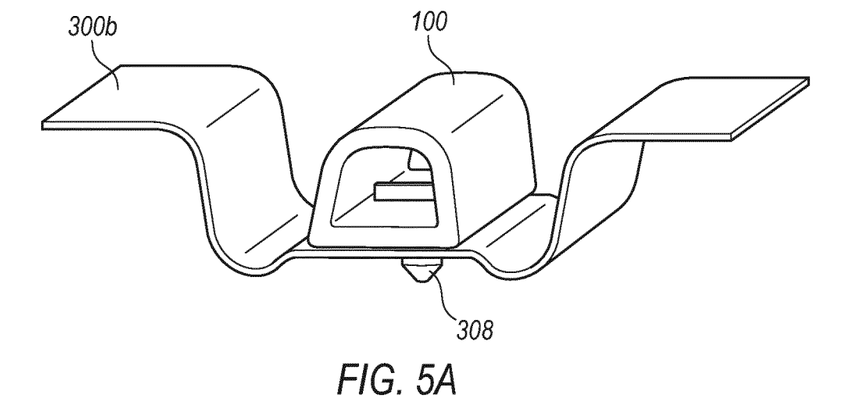
FIG. 5A illustrates a perspective view of another exemplary panel brace.
Figure 5B:
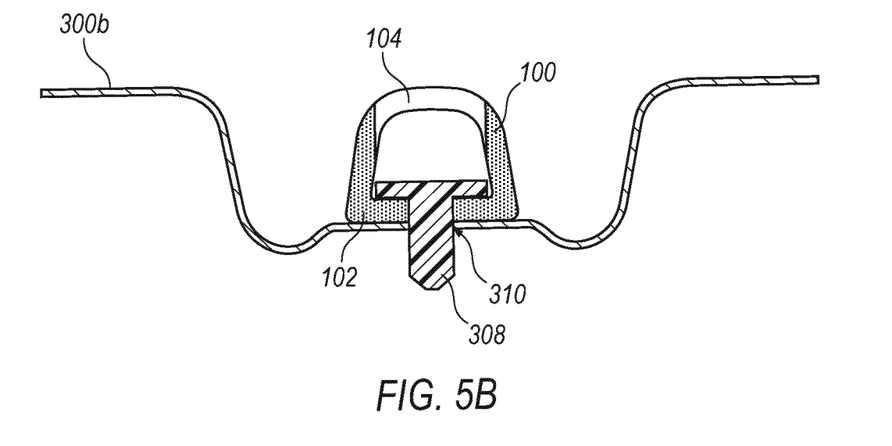
FIG. 5B illustrates a cross-sectional view of the exemplary panel brace of FIG. 5A.

Turning now to FIGS. 5A and 5B, another exemplary illustration of an expandable support 100 is illustrated. Expandable support 100 may be attached to support 300b by way of any mechanical fastener or clip 308. For example, as best seen in FIG. 5B, expandable support 100 may define an upper aperture 104 through which mechanical fastener 308 is inserted. The mechanical fastener 308 may extend through a bottom side of the body portion 102 of the expandable support 100, thereby affixing the expandable support 100 to support 300b. For example, the mechanical fastener 308 may be received within and/or positively engage an aperture 310 defined by the support 300b, thereby securing the expandable support 100 to the support 300.

Figure 6:
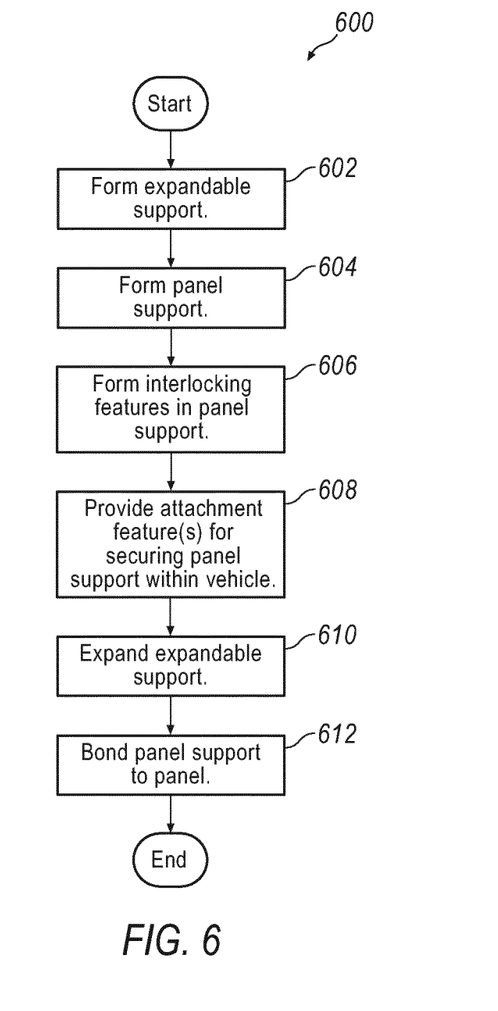
FIG. 6 illustrates a process flow diagram for an exemplary method of forming a reinforced panel.

Turning now to FIG. 6, an exemplary process flow diagram is illustrated for an exemplary method of forming an expandable support. Process 600 may begin at step 602, where an expandable support is formed. For example, as described above an expandable support 100 may be extruded from an expandable material. Moreover, the resulting expandable support may be generally non-tacky and in a solid form which facilitates assembly of the expandable support to a panel or support in various ways described herein, e.g., by assembly between interlocking features 304, by application of a bonding agent or adhesive 306, or by mechanical fasteners such as clips 308. Process 600 may then proceed to block 604.

At block 604, a panel support may be formed. For example, as described above, a panel support 300 may be formed, e.g., in a stamping operation. Further, as described above the panel support 300 may generally provide improved stiffness to an associated panel 200 after the panel support 300 is secured to the panel 200. Process 600 may then proceed to step 606.

At block 606, one or more interlocking features may be formed in the panel support to allow for selective secure meant of the expandable support within the panel support. For example, as described above one or more pairs of interlocking features 304 may be formed integrally with panel support 300. The interlocking features 304 may generally allow for selective insertion and removal of the expandable support 100.

Proceeding to block 608, attachment features 302 may be provided for securing the panel 200 to the support 300. In one example, the attachment features includes welding flanges or rivets. The attachment features may be configured to allow securement of the support 300 within a vehicle body while also spacing away the panel 200 to the support panel 300 by a predetermined gap G. The predetermined gap G may facilitate the flow of fluid, e.g., an electrocoating fluid, to flow into a cavity defined between the panel support 300 and panel 200. Process 600 may then proceed to block 610.

At block 610, the expandable support 100 may be expanded. For example, expandable support 100 may expand or foam under application of heat, as may be applied during a baking or oven process associated with a coating process of a vehicle.

Proceeding to block 612, the panel support 300 may be bonded to the panel 200. For example, as described above, as the expandable support 100 expands to fill a cavity between the panel support 300 and the panel 200, the expandable support 100 generally bonds the panel support 300 to the panel 200. Accordingly, the panel support 300 is generally permanently bonded to the panel 200.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A reinforced structure, comprising:
a panel support extending along a panel, the panel support being relatively rigid in comparison to the panel; and
an expandable support, including a body portion mounted on the panel support, the body portion formed of an expandable material such that the body portion is configured to engage the panel upon expansion, thereby providing an expanded support acting between the panel and the panel support after expansion, wherein the expandable support is formed of a material configured to expand to an expanded material having a compression Young's modulus less than 300 MPa;
wherein the panel support is attached to the panel by attachment features and the panel support is spaced away from the panel by a gap at the points of attachment of by the attachment features.

2. The reinforced structure as set forth in claim 1, wherein the panel support defines at least one pair of interlocking features configured to selectively retain the expandable support.

3. The reinforced structure as set forth in claim 2, wherein the interlocking features are integrally formed with the panel support.

4. The reinforced structure as set forth in claim 2, wherein the interlocking features define a minimum width smaller than a maximum width of the expandable support.

5. The reinforced structure as set forth in claim 1, wherein the expandable support is configured to expand to define a length along the panel after expansion, wherein the length is at least 30 millimeters.

6. The reinforced structure as set forth in claim 1, wherein the gap is larger than a thermal expansion tolerance defined between the panel support and the panel.

7. The reinforced panel as set forth in claim 1, wherein the expandable support is formed of a material configured to expand to an expanded material having a compression Young's modulus less than 100 MPa.

8. The reinforced panel as set forth in claim 1, wherein the expandable support defines a cross-sectional shape that is one of trapezoidal, rectangular, square, triangular, and round.

9. The reinforced panel as set forth in claim 1, wherein expandable support defines a cross-sectional shape that is generally hollow.

10. The reinforced panel as set forth in claim 1, wherein the expandable support is solid and non-tacky.

11. The reinforced panel as set forth in claim 1, wherein the expandable support is extruded.

12. The reinforced structure of claim 1, wherein the greater rigidity of the panel support relative the panel is achieved by the panel support being thicker than the panel and/or the panel support and the panel being made from different materials and the panel support material being more rigid than the panel material.

13. A reinforced structure, comprising:
a panel support extending along a panel, the panel support being relatively rigid in comparison to the panel;
an expandable support, including a body portion mounted on the panel support, the body portion formed of an expandable material such that the body portion is configured to engage the panel upon expansion, thereby providing an expanded support acting between the panel and the panel support after expansion, wherein the expandable support is formed of a material configured to expand to an expanded material having a compression Young's modulus less than 300 MPa;
at least one pair of interlocking features defined by the panel support and that are configured to selectively retain the expandable support, wherein the interlocking features define an angle $\alpha$ with a bottom surface of the panel support that is less than ninety degrees and/or the interlocking features include distal ends define a distance that is greater than a minimum distance between the interlocking features.

14. A method, comprising:
providing a panel support extending along a panel to define a predetermined gap, the predetermined gap being greater than a thermal expansion tolerance defined between the support and the panel;
forming an expandable support of an expandable material, the expandable support having a body portion, the body portion formed of an expandable material such that the body portion is configured to engage the panel upon expansion, thereby providing an expanded support acting between the panel and the panel support after expansion, wherein the expandable support is formed of a material configured to expand to an expanded material having a compression Young's modulus less than 300 MPa and having at least one pair of interlocking features defined by the panel support and that are configured to selectively retain the expandable support, wherein the interlocking features define an angle $\alpha$ with a bottom surface of the panel support that is less than ninety degrees and/or the interlocking features include distal ends define a distance that is greater than a minimum distance between the interlocking features; and
securing the body portion to the panel support.

15. The method as set forth in claim 14, wherein the step of securing the body portion to the panel support, includes inserting the body portion into at least one pair of interlocking features defined by the panel support.

* * * * *